(12) United States Patent
Zhang

(10) Patent No.: US 9,665,330 B2
(45) Date of Patent: May 30, 2017

(54) MOBILE TERMINAL AND DISPLAY METHOD THEREFOR

(75) Inventor: Yuanyi Zhang, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 16 days.

(21) Appl. No.: 13/810,518

(22) PCT Filed: Jul. 12, 2011

(86) PCT No.: PCT/CN2011/077080
§ 371 (c)(1),
(2), (4) Date: Jan. 16, 2013

(87) PCT Pub. No.: WO2012/006944
PCT Pub. Date: Jan. 19, 2012

(65) Prior Publication Data
US 2013/0113681 A1 May 9, 2013

(30) Foreign Application Priority Data
Jul. 16, 2010 (CN) .......................... 2010 1 0233553

(51) Int. Cl.
*G06F 3/14* (2006.01)
*G06F 1/16* (2006.01)

(52) U.S. Cl.
CPC .......... *G06F 3/1423* (2013.01); *G06F 1/1626* (2013.01); *G06F 1/1647* (2013.01); *G06F 1/1694* (2013.01); *G09G 2340/0492* (2013.01)

(58) Field of Classification Search
CPC ........ G06F 3/14; G06F 3/1423–3/1446; G06F 1/16; G06F 3/1613; G06F 3/1626;
(Continued)

(56) References Cited

U.S. PATENT DOCUMENTS

2007/0009234 A1* 1/2007 Van De Sluis ................. 386/96
2007/0085759 A1* 4/2007 Lee et al. ....................... 345/1.1
(Continued)

FOREIGN PATENT DOCUMENTS

CN 101188837 5/2008
CN 101594429 12/2009
(Continued)

OTHER PUBLICATIONS

Rejection Decision dated Jun. 5, 2013 of corresponding Chinese application No. 201010233553.3 (18 pages including English translation).
(Continued)

*Primary Examiner* — Nathan Danielsen
(74) *Attorney, Agent, or Firm* — Brinks Gilson & Lione; G. Peter Nichols

(57) ABSTRACT

A mobile terminal and a display method are described. The mobile terminal includes a first display unit provided on a first surface of the mobile terminal, for use in displaying, in a first spatial state, a first set of data in a first direction relative to the mobile terminal; a second display unit provided on a second surface of the mobile terminal, for use in displaying, in a second spatial state, a second set of data in a second direction relative to the mobile terminal. The first spatial state and the second spatial state are perpendicular to each other, and the first surface and the second surface are two different external surfaces of the mobile terminal.

7 Claims, 5 Drawing Sheets

(58) Field of Classification Search
CPC ........ G06F 3/163; G06F 3/1647–3/165; G06F 3/1684; G06F 1/1694; G06F 2200/1614; G06F 2200/1637; G09G 3/2092; G09G 3/2096; G09G 2300/02
USPC ............................ 345/1.1, 1.2, 3.1–3.4, 4–6
See application file for complete search history.

(56) References Cited

U.S. PATENT DOCUMENTS

| | | |
|---|---|---|
| 2008/0125181 A1 | 5/2008 | Yoon |
| 2009/0033630 A1* | 2/2009 | Thelen ........................ 345/173 |
| 2009/0102745 A1* | 4/2009 | Chan ............................ 345/1.3 |
| 2009/0106849 A1* | 4/2009 | Wu ................................ 345/1.3 |
| 2009/0295731 A1 | 12/2009 | Kim et al. |
| 2009/0295943 A1 | 12/2009 | Kim et al. |
| 2009/0298537 A1 | 12/2009 | Choi |
| 2009/0298546 A1 | 12/2009 | Kim et al. |
| 2009/0298547 A1 | 12/2009 | Kim et al. |
| 2009/0298548 A1 | 12/2009 | Kim et al. |
| 2009/0298554 A1 | 12/2009 | Kim et al. |
| 2010/0048194 A1 | 2/2010 | Park et al. |
| 2010/0181988 A1* | 7/2010 | Hong ................... G06F 1/1626 323/318 |
| 2012/0034953 A1* | 2/2012 | Chowdary .......... H04M 1/0237 345/1.3 |

FOREIGN PATENT DOCUMENTS

| | | |
|---|---|---|
| CN | 101710917 | 5/2010 |
| CN | 101710917 A | 5/2010 |

OTHER PUBLICATIONS

First Office Action dated Oct. 22, 2012 from corresponding Chinese Appln. No. 201010233553.3 (20 pages including 10 page English translation).
PCT/CN2011/077080 International Preliminary Report on Patentability dated Jan. 22, 2013 (11 sheets).
PCT/CN2011/077080 International Search Report dated Oct. 29, 2011 (2 pages).

* cited by examiner

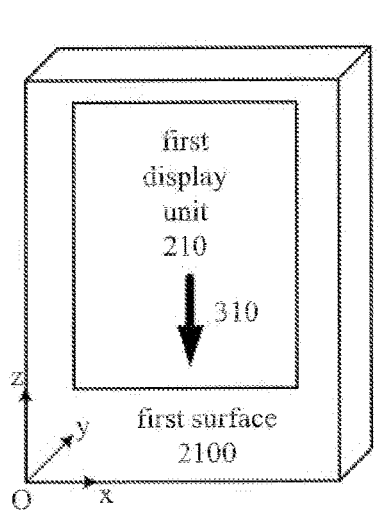
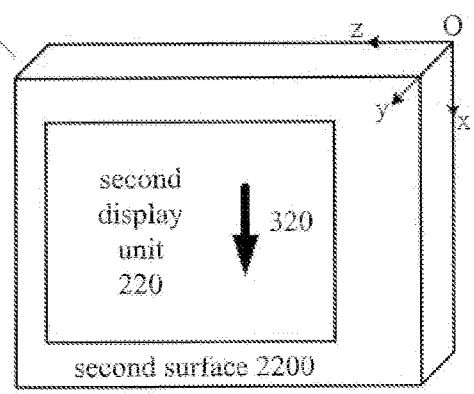
Fig.3A  Fig.3B
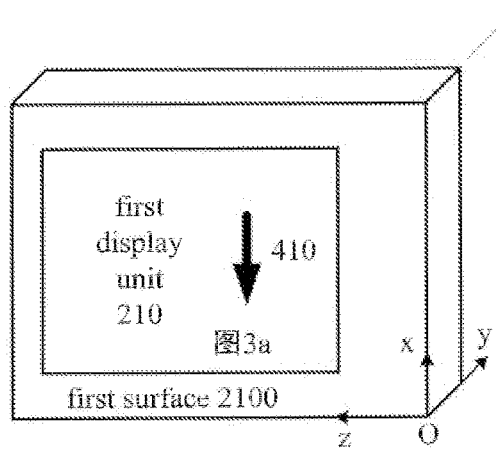
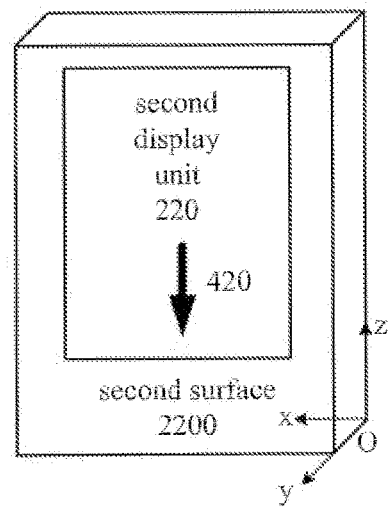
Fig.4A  Fig.4B

MOBILE TERMINAL AND DISPLAY METHOD THEREFOR

This application claims priority to International Application No. PCT/CN2011/077080 filed on Jul. 12, 2011; and to Chinese Patent Appln. CN 201010233553.3 filed on Jul. 16, 2010, the entire contents of each are incorporated herein by reference.

BACKGROUND

The invention refers to a mobile terminal, and more specifically, the invention refers to a mobile terminal having two display units.

Along with the widespread use of the portable mobile terminal, other than the basic operations such as voice communication, short message viewing or the like, also, the user often uses the mobile terminal to carry out video communication, picture viewing and webpage browsing or the like.

However, in a conventional mobile terminal, since the screen is relatively small, there often occurs problems such as, the displayed content desired to browse is incomplete, the fond of the text is too small or the picture being displayed is too small, etc. For these problems, there has proposed a mobile terminal having two display units. The conventional mobile terminal having two display units is generally a folded mobile terminal, and the two display units are provided on an inner surface and an outer surface of the mobile terminal respectively. This needs a cover turning operation as switching from one display unit to another display unit, which increases the complexity of the operation. Especially when the above operation is carried out with one hand, it easily causes the slip-down of the mobile terminal.

SUMMARY

For the above problems, according to one aspect of the invention, there provides a mobile terminal. The mobile terminal comprises: a first display unit provided on a first surface of the mobile terminal for displaying first data along a first direction with respect to the mobile terminal in a first space status; a second display unit provided on a second surface of the mobile terminal for displaying second data along a second direction with respect to the mobile terminal in a second space status, wherein, the first direction and the second direction are perpendicular to each other, and the first surface and the second surface are two different outer surfaces of the mobile terminal.

According to another aspect of the invention, there further provides a display method for a mobile terminal having a first display unit and a second display unit. The display method comprises the following steps: receiving the data to be displayed; processing the data to be displayed according to pre-setting to obtain first data having a first type and second data having a second type, wherein, the first type and the second type are different, and the first data is displayed on the first display unit, and the second data is displayed on the second display unit.

With the mobile terminal and display method of the embodiment of the invention, the content in one application can be spilt into two screens to display, the display area is increased, and since the first and second display units are located on different outer surfaces of the mobile terminal, the volume of the mobile terminal is not increased. Further the user can view the different display units of the mobile terminal according to the embodiment of the invention by turning the wrist, that is, there is no relative displacement between the hand and the equipment, the instance of slipping down the mobile phone accidentally as operating the mobile phone is avoided.

BRIEF DESCRIPTION OF THE DRAWINGS

In order to describe the technical solution of the embodiment of the invention more clearly, the accompanying drawings necessary for the description of the embodiments are explained simply. The accompanying drawings in the following description are only exemplary embodiments of the invention.

FIG. 3a and FIG. 3b are schematic views showing one example of the first space status and the second space status of the mobile terminal 200.

FIG. 4a and FIG. 4b are schematic views showing another example of the first space status and the second space status of the mobile terminal 200.

DETAILED DESCRIPTION

Hereinafter, the preferred embodiments of the invention are described in detail with reference to the accompanying drawings. It is noticed that in the specification and accompanying drawings, substantially same steps and elements are represented by same reference numbers, and the repetitive explanation on these steps and elements would be omitted.

Figure 1:
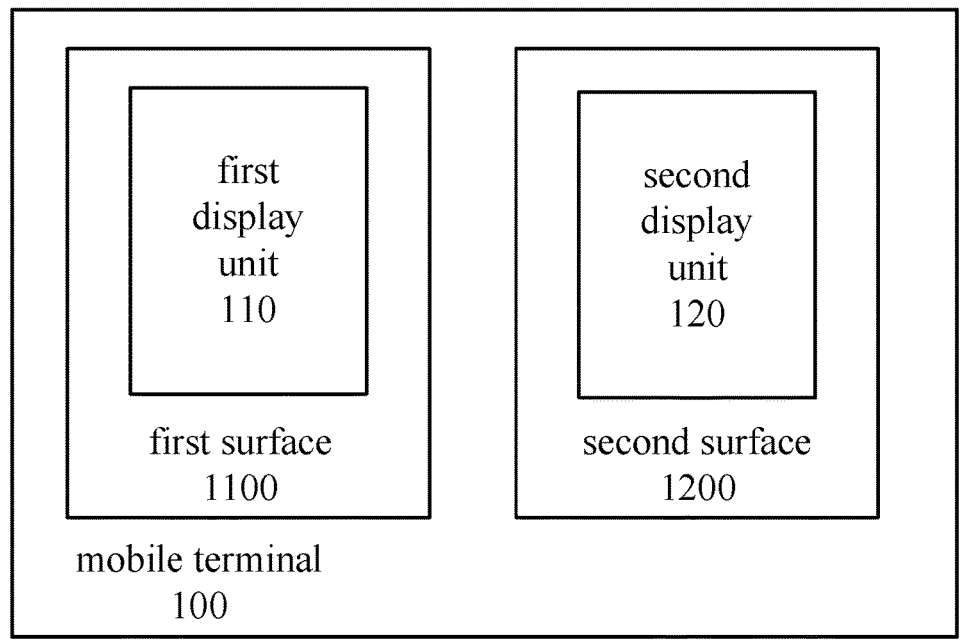
FIG. 1 is an exemplary block view showing the structure of the mobile terminal according to the embodiment of the invention.

Hereinafter, the mobile terminal of the embodiment of the invention is explained with reference to FIG. 1. FIG. 1 is an exemplary block view showing the structure of the mobile terminal 100 according to the embodiment of the invention. As shown in FIG. 1, the mobile terminal 100 of the embodiment comprises; a first display unit 110 and a second display unit 120. The first display unit 110 and the second display unit 120 may comprise display screens of same type, and may comprise display screens of different types. For example, the first display unit 110 may comprise a display screen of type such as TFT, OLED or the like, and the second display unit 120 may comprise a display screen of low power consumption such as a display screen of type of Memory LCD, E-Ink or the like.

As shown in FIG. 1, the first display unit 110 is provided on the first surface 1100 of the mobile terminal 100, and may be used to display first data along a first direction with respect to the mobile terminal 100 in a first space status. The second display unit 120 is provided on a second surface 1200 of the mobile terminal 100, and may be used to display second data along a second direction with respect to the mobile terminal 100 in a second space status, for example, the first space status may be a space status of the first surface 1100 facing the user when the user holds the mobile terminal 100. The second space status may be a space status of the second surface 1200 facing the user when the user holds the mobile terminal 100. In the first space status and the second space status, the bodies of the mobile terminal 100 may be perpendicular to each other with respect to the user. Further, the first direction in the first space status and the second direction in the second space status of the mobile terminal can be preset. Alternatively, the current space status of the mobile terminal can be determined by providing a sensor in the mobile terminal, so as to execute corresponding operation according to the result of the determination. The first space status and the second space status of the mobile terminal are described in detail hereinafter.

The first direction and the second direction are perpendicular to each other. However, as understood by those skilled in the art, due to the reason such as fabricating process or the like, the perpendicularity in the embodiment is not absolute. The first direction and the second direction being perpendicular to each other may comprise the first direction and the second direction being perpendicular to each other with a tolerance, for example, an error of ±5 degree or ±10 degree is allowed.

Further, in the embodiment of the invention, the first data and the second data may be data of same type, and may be data of different types. For example, the first data may be text data and the second data may be image data, or both of the first, data and the second data are text data or image data. And the image data may be still image data, and may be motion image data, for example video stream. And, the first data and the second data may be data of same type with same content.

Further, the first surface 1100 and the second surface 1200 may be two different outer surfaces of the mobile terminal 100. For example, the first surface 1100 and the second surface 1200 are two opposite outer surfaces of the mobile terminal 100. Alternatively, the first surface 1100 and the second surface 1200 are two adjacent outer surfaces of the mobile terminal 100.

According to the embodiment of the invention, it can display with two display units under different space statuses of the mobile terminal, and when the user carries out switch under two space statuses, the finger holding the mobile terminal need not to move with respect to the mobile terminal, and it only need the rotation of the wrist. Thereby, the switch of the space statuses is more convenient, and at the same time it can prevent slip-out of the mobile terminal caused by such relative movement, and the watching experience of the user is improved.

Figures 2A, 2B:
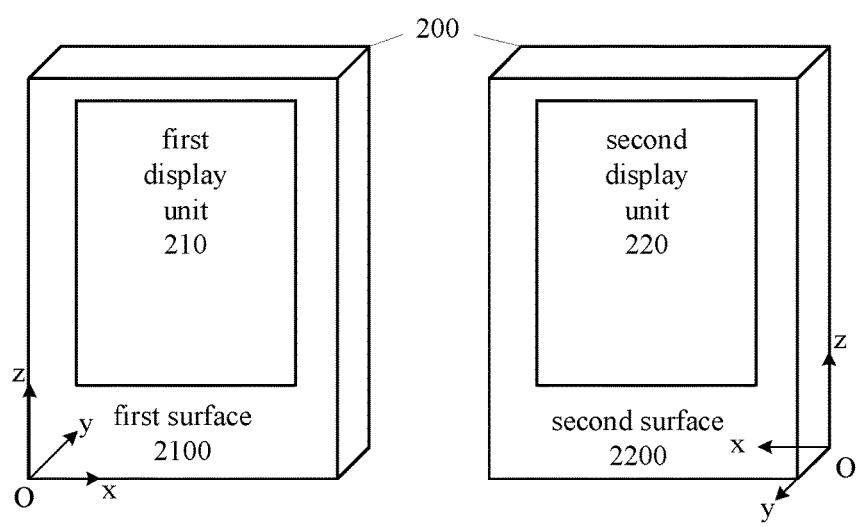
FIG. 2a and FIG. 2b are schematic views showing the first surface and the second surface of the mobile terminal according to the embodiment of the invention.

Hereinafter it will explain taking the first surface and the second surface as the two opposite outer surfaces of the mobile terminal as example. FIG. 2a and FIG. 2b are schematic views showing the first surface 2100 and the second surface 2200 of the mobile terminal 200 according to the embodiment of the invention. FIG. 2a is a front view perspective of the mobile terminal 200, and FIG. 2b is a back view perspective of the mobile terminal 200. As shown in FIG. 2a and FIG. 2b, in a reference coordinate system with the mobile terminal 200 as reference (for example, as shown in FIG. 2a, the bottom left corner of the first surface in the front view perspective is the origin O of the coordinate system, and it is same for the following figures), it assumes that the width direction of the mobile terminal 200 is X-axis, and the thickness direction is Y-axis, and the height direction is Z-axis. The first display unit 210 is provided on the first surface 2100 of the mobile terminal 200, and the second display unit 220 is provided on the second surface 2200 of the mobile terminal 200. The first surface 2100 and the second surface 2200 are two opposite outer surfaces of the mobile terminal 200.

Hereinafter, the first space status and the second space status of the mobile terminal 200 will be described in detail with reference to FIG. 3a and FIG. 3b and FIG. 4a and FIG. 4b. FIG. 3a and FIG. 3b are schematic views showing one example of the first space status and the second space status of the mobile terminal 200. In this embodiment, it will explain by taking the first data as text data and the second data as image data as example.

As shown in FIG. 3a, when the mobile terminal 200 is in the first space status, the first surface 2100 faces the user longitudinally (for example, Z-axis upward). The first display unit 210 displays the first data along the negative direction of Z-axis in a plane on which X-axis and Z-axis are under the first space status, i.e., as shown by the arrow 310 in FIG. 3a.

As shown in FIG. 3b, the mobile terminal 200 is rotated by 90 degree from the first space status with Y-axis as axis of rotation, then the mobile terminal 200 is rotated by 180 degree with the rotated Z-axis as axis of rotation, resulting in the second space status of the mobile terminal 200. That is, in the embodiment, when the user holds the mobile terminal 200 longitudinally with the right hand under the first space status, the user turns the right hand and holds the mobile terminal 200 transversally, so that the mobile terminal 200 is made switch to the second space status from the first space status. While the mobile terminal 200 is in the second space status, the second surface 2200 faces the user transversally (for example, Z-axis leftwards). The second display unit 220 displays the second data along a positive direction of X-axis in a plane on which X-axis and Z-axis are under the second space status, i.e., as shown by arrow 320 in FIG. 3b. In term of the reference. i.e., the mobile terminal 200, the directions shown by the arrow 310 and 320 are perpendicular to each other (i.e., the negative direction of Z-axis is perpendicular to the positive direction of the X-axis).

FIG. 4a and FIG. 4b are schematic views showing another example of the first space status and the second space status of the mobile terminal 200 respectively. Similar to the examples shown in FIG. 3a and FIG. 3b, in the embodiment, it will explain by taking the first data as text data and the second data as image data as example.

As snow in FIG. 4a, when the mobile terminal 200 is in the first space status, the first surface 2100 faces the user transversally (for example, Z-axis leftwards). The first display unit 210 displays the first data along the negative direction of X-axis in a plane on which X-axis and Z-axis are under the first space status, i.e., as shown by the arrow 410 in FIG. 4a.

As shown in FIG. 4b, the mobile terminal 200 is rotated by 90 degree from the first space status with Y-axis as axis of rotation, then the mobile terminal 200 is rotated by 180 degree with the rotated Z-axis as axis of rotation, resulting in the second space status of the mobile terminal 200. That is, in the embodiment, when the user holds the mobile terminal 200 transversely with the right hand under the first space status, the user turns the right hand and holds the mobile terminal 200 longitudinally, so that the mobile terminal 200 is made switch to the second space status from the first space status. While the mobile terminal 200 is in the second space status, the second surface 2200 faces the user longitudinally (for example, Z-axis upward). The second display unit 220 displays the second data along a negative direction of Z-axis in a plane on which X-axis and Z-axis are under the second space status, i.e., as shown by arrow 420 in FIG. 4*b*. In term of the reference, i.e., the mobile terminal 200, the directions shown by the arrow 410 and 420 are perpendicular to each other (i.e., the negative direction of X-axis is perpendicular to the negative direction of the Z-axis).

In the embodiments shown in FIG. 3*a* and FIG. 3*b* and FIG. 4*a* and FIG. 4*b*, the first space status and the second space status of the mobile terminal 200 are interchangeable. For example, the status shown in FIG. 3*b* may be the first space status, and the status shown in FIG. 3*a* may be the second space status. Similarly, the status shown in FIG. 4*b* may be the first space status, and the status shown in FIG. 4*a* may be the second space status.

Further the embodiments shown in FIG. 3*a* and FIG. 3*b* and FIG. 4*a* and FIG. 4*b* are only examples of the first space status and the second space status of the mobile terminal. For example, the first space status or the second space status can be symmetrical to the specific space status shown in the FIGS. In such cases, the first direction is still perpendicular to the second direction with respect to the mobile terminal. In one embodiment, when the user holds the mobile terminal 200 longitudinally with the left hand under the first space status shown in FIG. 3*a*, the user turns over the left hand and holds the mobile terminal 200 transversally, so that the mobile terminal 200 is made switch from the first space status to the second space status (i.e., Z-axis rightwards, the orientations of the X-axis and the Y-axis are same as those in FIG. 3*b*) that is dot-symmetrical to the status shown in FIG. 3*b* (being symmetrical with respect to the O point in X-Z plane).

In another embodiment, when it takes the status shown in FIG. 4*a* as the first space status, and the user holds the mobile terminal 200 transversally with the left hand under such status, the user turns over the left hand and holds the mobile terminal 200 longitudinally, so that the mobile terminal 200 is made switch from the first space status to the second space status (i.e., X-axis rightwards, Z-axis downwards, and the orientation of the Y-axis is same as that in FIG. 4*b*) mirror-symmetrical to the status shown in FIG. 4*b* (being symmetrical to the O point in the X-Z plane).

When the user browses a webpage including text data and image data, with the mobile apparatus of the embodiment, text information can be displayed on the first display unit 210, and image information can be displayed on the second display unit 220. In this way, the user can view the content displayed on the webpage clearly only through turning over the wrist.

In an alternative embodiment, the first data and the second data can be both text data. When the text information included in the data displayed to be viewed by the user is relatively more, all of the text information may not be possible to be displayed on the first display unit. In this case, the text information that can not be displayed on the first display unit can be displayed on the second display unit. In this way, the user can view the display data only through turning over the wrist without a page turn operation.

In the mobile terminal of another embodiment of the invention, it further comprises a receiving unit (not show) for receiving the first data and the second data. A first data interface for receiving the first data and a second data interface for receiving the second data can be configured in the receiving unit, in the case that the content provider provides two streams of data of the first data and the second data respectively, the first data and the second data can be received through the first data interface and the second data interface respectively, and provided to the first display unit and the second display unit.

In an alternative embodiment, the mobile terminal may further comprise a receiving unit and a processing unit (not show). The receiving unit may receive the data to be displayed. The processing unit may process the data to be displayed received by the receiving unit to obtain the first data and the second data. In the case that the content provider only provides data to be displayed (for example, the data included in the above webpage) but not classifies it into the first data (for example, the text information) and the second data (for example, the image information), the processing unit may process the data to be displayed according to a preset processing, and provide the obtained first data and second data to the first display unit and the second display unit respectively. In case that the webpage to be displayed includes a relatively large image, the processing unit may compress the image information to obtain the second data. Furthermore, in case that the webpage to be displayed includes dynamic image, the processing unit may treat the dynamic image information as the second data, and may pick out one picture of the dynamic image as the second data.

The direction of display of the first display unit and the second display unit of the mobile apparatus can be preset according to the manner of general rotation of the wrist. For example, in the embodiment shown in FIG. 3*a* and FIG. 3*b*, it may preset that the first display unit 210 displays the first data along the negative direction of the Z-axis in the plane on which X-axis and Z-axis are in the operational mode that two display units are turned on to display. The second display unit 220 displays the second data along the positive direction of X-axis in a plane on which X-axis and Z-axis are.

Further, it may be possible to provide a sensor in the mobile apparatus to detect the current space status of the mobile terminal and display according to the detection result. Hereinafter, it will be explained in detail.

Figure 5:
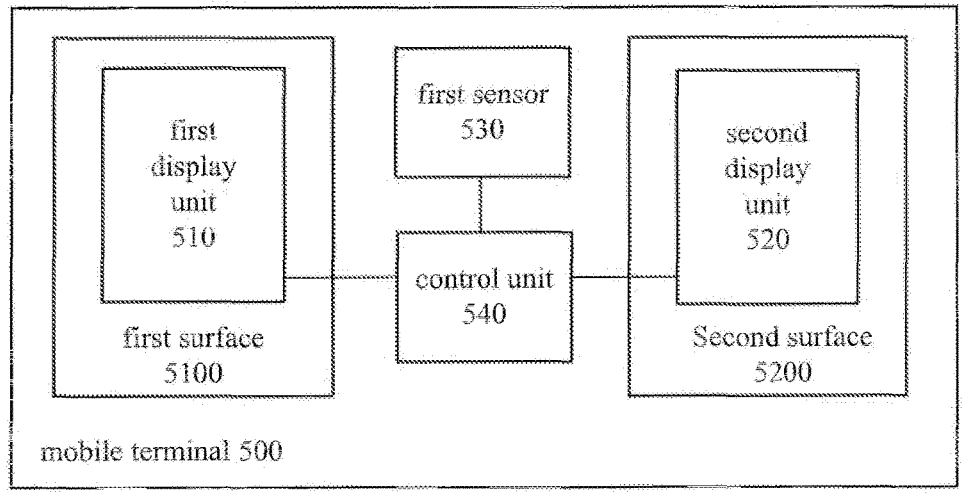
FIG. 5 is an exemplary block view showing the structure of the mobile terminal according to another embodiment of the invention.

Hereinafter, the electronic apparatus according to another embodiment of the invention will be explained with reference to FIG. 5. FIG. 5 is an exemplary block view showing the structure of the mobile terminal according to another embodiment of the invention. As shown in FIG. 5, similar to the electronic apparatus 100, the electronic apparatus 500 comprises a first display unit 510 and a second display unit 520. The first display unit 510 is provided on the first surface 5100 of the mobile terminal 500, and may be used for displaying the first data along the first direction in the first space status. The second display unit 520 is provided on the second surface 5200 of the mobile terminal 500, and may be used for displaying the second data along the second direction in the second space status. The first direction and the second direction are perpendicular to each other with respect to the mobile terminal 500. In the embodiment, the first surface 5100 and the second surface 5200 are two opposite outer surfaces of the mobile terminal 500.

The mobile terminal 500 in the embodiment further comprises a first sensor 530 and a control unit 540. The first sensor 530 can determine the space status of the mobile terminal 500. The first sensor 530 can comprise a gyroscope for detecting the turn of the mobile terminal 500, a terrestrial magnetism sensor for detecting the angle of tilt of the mobile terminal 500 or a photosensor for sensing the motion of the mobile terminal 500 by detecting the variation of the reflected light, etc. The control unit 540 can control the display mode of the first or the second display unit according to the space status determined by the first sensor 530.

It will be described with reference to the embodiments shown in FIG. 3a and FIG. 3b by taking the first sensor 530 comprising a gyroscope for example, it assumes that the first space status of the mobile terminal 500 is shown in FIG. 3a, the second space status is shown in FIG. 3b, and the first space status of the mobile terminal 500 is an initial status of the gyroscope in the first sensor 530. When the first sensor 530 determines that the mobile terminal 500 is in the initial status, the control unit 540 controls the first display unit 510 to display, and control the second display unit 520 to be in close status to save power consumption. Further, when the first sensor 530 determines that the mobile terminal 500 is in the initial status, the control unit 540 can further control the first display unit 510 to display the first data along the negative direction of Z-axis in a plane on which X-axis and Z-axis are.

When the user holds the mobile terminal 500 with the right hand and turns over, the mobile terminal 500 is switched from the first space status to the second space status, the first sensor 530 determines the space status of the mobile terminal 500 by detecting the angle of rotation detected by the gyroscope, that is, the mobile terminal 500 carrying out the turn can be determined by detecting the varied angle of the gyroscope and thus the direction of the turn can be determined. The control unit 540 can control the second display unit 520 to display according to the space status determined by the first sensor 530, and control the first display unit 510 to be in close status to save power consumption. Further, according to the direction of the turn determined, the control unit 540 can further control the second display unit 520 to display the second data along the positive direction of X-axis in a plane on which X-axis and Z-axis are.

In another embodiment of according to the invention, it assumes that the first space status of the mobile terminal 500 is shown in FIG. 3a, and the second space status is mirror symmetry to the status shown in FIG. 3b, and the first space status of the mobile terminal 500 is the initial status of the gyroscope of the first sensor 530. When the first sensor 530 determines that the mobile terminal 500 is in the initial status, the control unit 540 controls the first display unit 510 to display, and controls the second display unit 520 to be in close status to save power consumption. Further, when the first sensor 530 determines that the mobile terminal 500 is in the initial status, the control unit 540 can further control the first display unit 510 to display the first data along the negative direction of Z-axis in a plane on which X-axis and Z-axis are.

When the user holds the mobile terminal 500 with the left hand and turns over, the mobile terminal 500 is switched from the first space status to the second space status, the first sensor 530 determines the space status of the mobile terminal 500 by detecting the angle of rotation detected by the gyroscope, that is, the mobile terminal 500 carrying out the turn can be determined by detecting the varied angle of the gyroscope and thus the direction of the turn can be determined. The control unit 540 can control the second display unit 520 to display according to the space status determined by the first sensor 530, and control the first display unit 510 to be in close status to save power consumption. The display unit being in the close status comprises for example turning off the power supply of the display unit; or the display unit being in a sleep status of low power consumption. Further, according to the direction of the turn determined, the control unit 540 can further control the second display unit 520 to display the second data along the negative direction of X-axis in a plane on which X-axis and Z-axis are.

Though in the embodiment, it is described by taking an example that the first sensor 530 determines the space status of the mobile terminal 500 by detecting the angle of rotation of the mobile terminal 500 with respect to the first space status through the gyroscope, the invention is not limited thereto. For example, the first sensor 530 may comprise a gravity sensor, and detect the angle of tilt of the mobile terminal 500 with respect to the gravity direction by the gravity sensor, and the control unit 540 can control the display mode of the first or the second display unit according to the space status determined by the first sensor 530.

Figure 6:
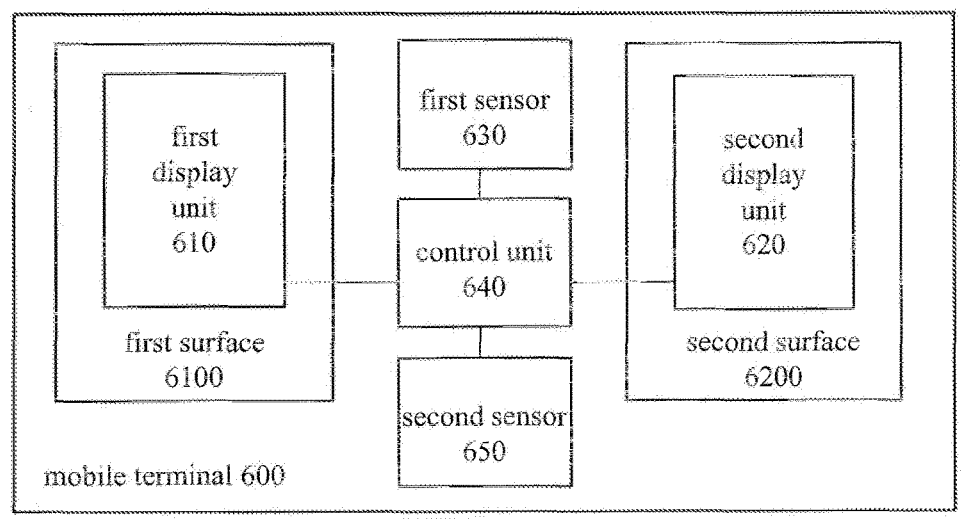
FIG. 6 is an exemplary block view showing the structure of the mobile terminal according to yet another embodiment of the invention.

Hereinafter, the electronic apparatus according to yet another embodiment of the invention will be explained with reference to FIG. 6. FIG. 6 is an exemplary block view showing the structure of the mobile terminal 600 according to yet another embodiment of the invention. As shown in FIG. 6, similar to the electronic apparatus 500, the electronic apparatus 600 comprises a first display unit 610, a second display unit 620, a first sensor 630 and a control unit 640. The first display unit 610 is provided on a first surface 6100 of the mobile terminal 600, and can be used for displaying the first data along the first direction in the first space status. The second display unit 620 is provided on a second surface 6200 of the mobile terminal 600, and can be used for displaying the second data along the second direction in the second space status. The first direction and the second direction are perpendicular to each other with respect to the mobile terminal 600. In the embodiment, the first surface 6100 and the second surface 6200 are two opposite outer surfaces of the mobile terminal 600. The first sensor 630 can determine the space status of the mobile terminal by detecting the angle of rotation of the mobile terminal 600 with respect to a predetermined space status. The control unit 640 can control the display mode of the first or the second display unit according to the space status determined by the first sensor 630.

The mobile terminal 600 further comprises a second sensor 650 for determining the angle between the mobile terminal 600 and the gravity direction. The control unit 640 further controls the first direction and/or the second direction according to the angle detected by the second sensor 650.

It will describe with reference to FIG. 3a and FIG. 3b and FIG. 4a and FIG. 4b by taking the first sensor 630 comprising a gyroscope and the second sensor 650 comprising a gravity sensor as example. As above mentioned, the gyroscope can determine the space status of the mobile terminal by detecting the angle of rotation of the mobile terminal 600 with respect to the predetermined space status. The gravity sensor determines the angle between the mobile terminal 600 and the gravity direction by detecting the posture of the body of the mobile terminal 600.

It assumes that the first space status of the mobile terminal 600 is shown in FIG. 3a, the second space status is shown in FIG. 3b, and the first space status of the mobile terminal 600 is an initial status of the gyroscope in the first sensor 630. When the user holds the mobile apparatus 600 longitudinally as shown in FIG. 3a, the first sensor 630 determines that the mobile terminal 600 is in the initial status, and the gravity sensor in the second sensor 650 detects that the posture of the body is longitudinal, so as to determine that the angle between the body of the mobile terminal 600 and the gravity direction is 0 degree. The control unit 640 controls the first display unit 610 to display the first data along the negative direction of Z-axis in a plane on which X-axis and Z-axis are and controls the second display unit 620 to be in close status to save power consumption according to the determination result of the first sensor 630 and the second sensor 650.

When the user holds the mobile terminal 600 with the right hand and turns over, the mobile terminal 600 is switched from the first space status to the second space status, the first sensor 630 determines the space status of the mobile terminal 600 by detecting the angle of rotation detected by the gyroscope, that is, the mobile terminal 600 carrying out the turn can be determined by detecting the varied angle of the gyroscope and thus the direction of the turn can be determined. And the gravity sensor in the second sensor 650 detects that the posture of the body is transversal, so as to determine that the angle between the body of the mobile terminal 600 and the gravity direction is 90 degree. The control unit 640 can control the second display unit 620 to display the second data along the positive direction of X-axis in a plane on which X-axis and Z-axis are and control the first display unit 610 to be in close status to save power consumption according to according to the determination result of the first sensor 630 and the second sensor 650.

According to another embodiment of the invention, it assumes that the first space status of the mobile terminal 600 is shown in FIG. 4a, the second space status is shown in FIG. 4b, and the first space status of the mobile terminal 600 is the initial status of the gyroscope in the first sensor 630. When the user holds the mobile apparatus 600 longitudinally as shown in FIG. 4a, the first sensor 630 determines that the mobile terminal 600 is in the initial status, and the gravity sensor in the second sensor 650 detects that the posture of the body is transversal, so as to determine that the angle between the body of the mobile terminal 600 and the gravity direction is 90 degree. The control unit 640 controls the first display unit 610 to display the first data along the negative direction of X-axis in a plane on which X-axis and Z-axis are and controls the second display unit 620 to be in close status to save power consumption according to the determination result of the first sensor 630 and the second sensor 650.

When the user holds the mobile terminal 600 with the right hand and turns over, the mobile terminal 600 is switched from the first space status to the second space status, the first sensor 630 determines the space status of the mobile terminal 600 by detecting the angle of rotation detected by the gyroscope, that is, the mobile terminal 600 carrying out the turn can be determined by detecting the varied angle of the gyroscope and thus the direction of the turn can be determined. And the gravity sensor in the second sensor 650 detects that the posture of the body is longitudinal, so as to determine that the angle between the body of the mobile terminal 600 and the gravity direction is 0 degree. The control unit 640 can control the second display unit 620 to display the second data along the negative direction of Z-axis in a plane on which X-axis and Z-axis are and control the first display unit 610 to be in close status to save power consumption according to the determination result of the first sensor 630 and the second sensor 650.

The first sensor 630 and the second sensor 640 are shown as separate units in FIG. 6, and the embodiment of the invention is explained with the two sensors are sensors of different types. However, the embodiments of the invention are not limited thereto. For example, in another embodiment of the invention, the first sensor 630 and the second sensor 640 can be implemented by one sensor unit, for example, a three-dimensional gyroscope.

Figure 7:
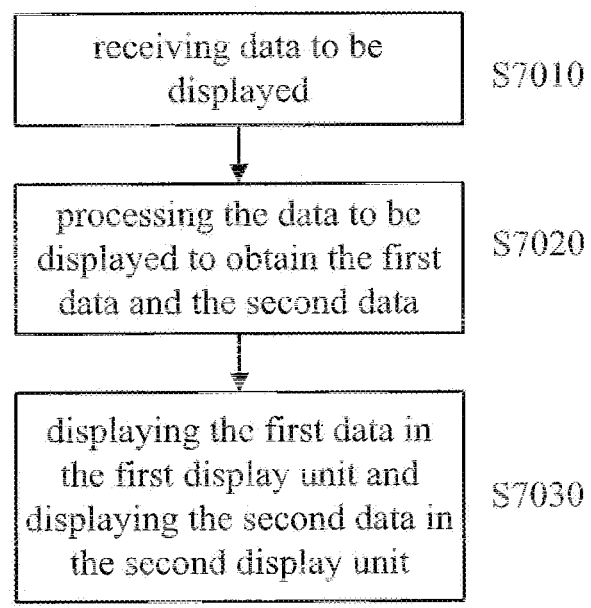
FIG. 7 is a flow chart illustrating the display method according to the embodiment of the invention.

Hereinafter, the display method of the embodiment of the invention is explained with reference to FIG. 7. FIG. 7 is a flow chart illustrating the display method 7000 according to the embodiment of the invention. The display method 7000 can be used for the mobile terminal having the first display unit and the second display unit, and respective steps in the display method 7000 can be executed by the corresponding modules in the mobile terminal in the above FIG. 1, FIG. 5 or FIG. 6 respectively, therefore, for the concision of the description, it will be no longer described in detail.

In the stop S7010 of FIG. 7, data to be displayed is received. At step S7020, the data to be displayed is processed according to a preset to obtain first data of a first type and second data of a second type, wherein, the first type and the second type are different. And, at step S7030, the first data is displayed on the first display unit, and the second data is displayed on the second display unit. As above mentioned, the first type can be preset as text type, and the second type is image type.

As shown in FIG. 1, FIG. 5 or FIG. 6, the first display unit of the mobile terminal is provided on the first surface of the mobile terminal, for displaying the first data along the first direction with respect to the mobile terminal in the first space status. The second display unit is provided on the second surface of the mobile terminal, for displaying the second data along the second direction with respect to the mobile terminal in the second space status. The first surface and the second surface are two different outer surfaces of the mobile terminal. And the first direction and the second direction are perpendicular to each other.

Figure 8:
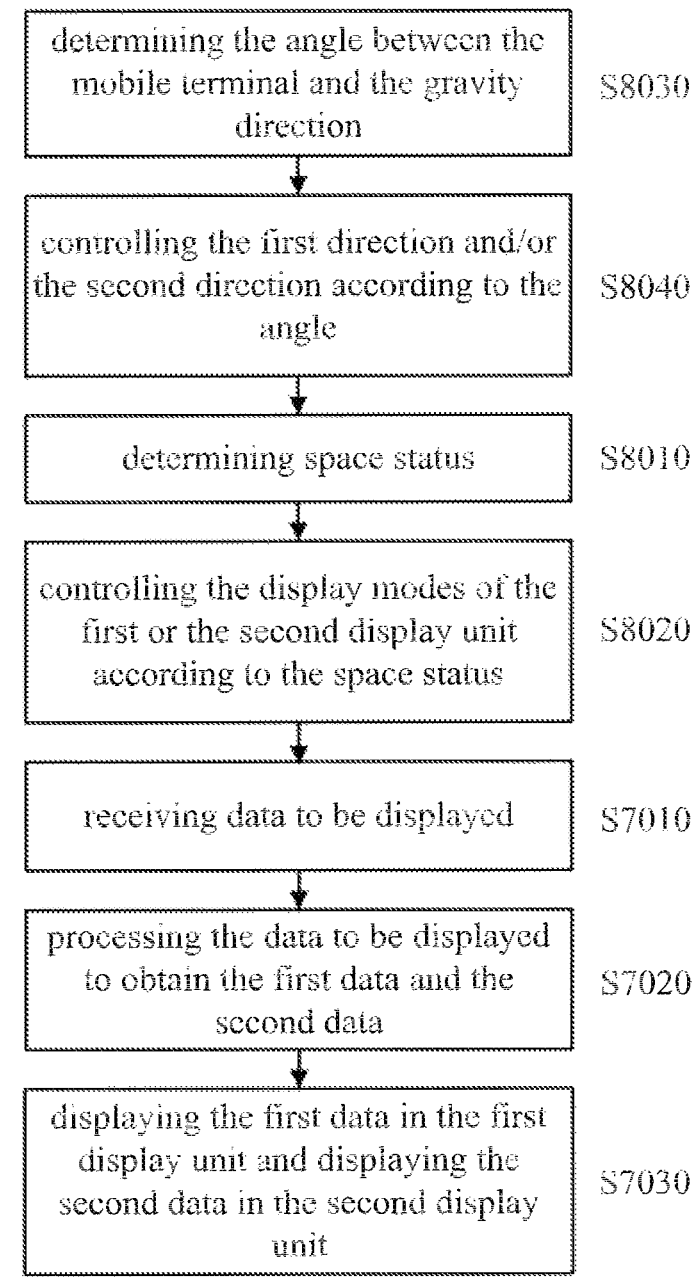
FIG. 8 is a flow chart illustrating the display method according to the embodiment of the invention.

FIG. 8 is a flow chart illustrating a display method 8000 according to another embodiment of the invention. According to another embodiment of the invention, the display method 8000 comprises the step S7010 to step S7030 that are same as in the display method 7000, further, the display method 8000 further comprises determining the space status of the mobile terminal (step S8010), and controlling the display mode of the first or the second display unit according to the determined space status (step S8020). Though it shows executing the steps S8010 and S8020 before the step S7010 in FIG. 8, the display method 8000 can be executed in other order. For example, the steps S8010 and S8020 can be executed between the step S7020 and the step S7030, and can be executed concurrently with the step S7010 and the step S7020.

As in the mobile terminal shown in the above FIG. 5, controlling the display mode of the first or the second display unit according to the determined space status in step S8020 may comprise: controlling the on or off of the first display unit according to the determined space status and controlling the on or off of the second display unit according to the determined space status. Further the step S8020 may further comprise controlling the first or the second direction according to the determined space status.

As in the mobile terminal shown in the above FIG. 6, the step S8010 comprises determining the space status of the mobile terminal by detecting the angle of rotation of the mobile terminal with respect to the predetermined space status. The display method 8000 may further comprise: determining the angle between the mobile terminal and the gravity direction (step S8030); and controlling the first direction and/or the second direction according to the determined angle between the first direction and/or the second direction and the gravity direction (step S8040). The steps S8030 and S8040 can be executed before the step S8010. Alternatively, the step S8030 can be executed concurrently with the step S8010, and the step S8040 can be executed concurrently with the step S8020.

As above mentioned, according to the embodiment of the invention, the mobile terminal increases the display area without increasing the design volume of the mobile terminal. When the first display unit and the second display unit of the mobile terminal according to the embodiment of the invention are viewed, there is no relative displacement between the hand and the equipment, so as to avoid the case that the mobile phone slip downs accidentally as operating the mobile phone. The mobile terminal and the display method according to the invention can be widely used in applications such as calling, information viewing, news reading, online shopping, etc.

Those skilled in the art can understand the units and algorithm steps of respective examples described in combination with the embodiments of the specification can be implemented by electronic hardware, computer software or the combination of both, in order to explain the interchangeability of the hardware and the software, the constitution and steps of the respective examples are described generally according to the function in the above description. Whether the functions are executed by hardware or software depends on the specific applications and design constraint of the technical solution. Those skilled in the art can implement the described function by using different methods for each specific application, and such implementations are not regarded as going beyond the scope of the invention.

Those skilled in the art can understand that the invention can be made various modifications, combinations, partial combinations and alternation depending on the design need and other factors, so long as they are within the range of the attached claims and the equivalent ones.

What is claimed is:

1. A mobile terminal, comprising:
   a first display unit provided on a first surface of the mobile terminal for displaying first data along a first direction with respect to the mobile terminal in a first space status;
   a second display unit provided on a second surface of the mobile terminal, for displaying second data along a second direction with respect to the mobile terminal in a second space status,
   a receiving unit for receiving the data to be displayed;
   a processing unit for automatically processing the data to be displayed to obtain the first data and the second data, wherein both of the first data and the second data are content of the data to be displayed;
   a first sensor for determining the space status of the mobile terminal; and
   a control unit for controlling the display mode of the first or the second display unit according to the space status determined by the first sensor;
   wherein, the first direction and the second direction are perpendicular to each other,
   the first surface and the second surface are two different outer surfaces of the mobile terminal,
   the second data is text information included in the data to be displayed which cannot be displayed on the first display unit,
   the control unit controls on or off of the first display unit according to the space status determined by the first sensor, and controls on or off of the second display unit according to the space status determined by the first sensor,
   the first sensor determines the space status of the mobile terminal by detecting the angle of rotation of the mobile terminal with respect to a predetermined space status, and
   the first surface and the second surface are two opposite outer surfaces of the mobile terminal.

2. The mobile terminal according to claim 1, wherein, the first direction and the second direction being perpendicular to each other comprises the first direction and the second direction are perpendicular to each other with respect to the mobile terminal with a tolerance.

3. The mobile terminal according to claim 1, wherein, controlling the display mode of the first or the second display unit according to the space status determined by the first sensor comprises:
   controlling the first or the second direction according to the space status determined by the first sensor.

4. The mobile terminal according to claim 1, wherein, the first sensor determines the space status of the mobile terminal by detecting the angle of rotation of the mobile terminal with respect to a predetermined space status,
   the mobile terminal further comprises a second sensor for determining an angle between the mobile terminal and the gravity direction,
   the control unit further controls the first direction and/or the second direction according to the angle determined by the second sensor.

5. A display method for a mobile terminal having a first display unit and a second display unit, the method comprising the following steps:
   receiving the data to be displayed;
   automatically processing the data to be displayed according to a preset to obtain first data and second data, wherein, the second data is text information included in the data to be displayed which cannot be displayed on the first display unit;
   displaying the first data in the first display unit and displaying the second data in the second display unit;
   determining the space status of the mobile terminal by detecting an angle of rotation of the mobile terminal with respect to a predetermined space status;
   controlling on or off of the first display unit according to the space status determined by the first sensor; and
   controlling on or off of the second display unit according to the determined space status, wherein
   a first display unit is provided on a first surface of the mobile terminal for displaying first data along a first direction with respect to the mobile terminal in a first space status;
   a second display unit is provided on a second surface of the mobile terminal, for displaying second data along a second direction with respect to the mobile terminal in a second space status,
   wherein, the first direction and the second direction are perpendicular to each other, and
   the first surface and the second surface are two different outer surfaces of the mobile terminal.

6. The method according to claim 5, wherein, controlling the display mode of the first or the second display unit according to the determined space status comprises:
   controlling the first or the second direction according to the determined space status.

7. The method according to claim 5, wherein, determining the space status of the mobile terminal comprises determining the space status of the mobile terminal by detecting the angle of rotation of the mobile terminal with respect to the predetermined space status,
   the method further comprising:
   determining the angle between the mobile terminal and the gravity direction; and controlling the first direction and/or the second direction according to the angle between the determined first direction and/or the second direction and the gravity direction.

\* \* \* \* \*